United States Patent
Ku et al.

(10) Patent No.: US 7,642,000 B2
(45) Date of Patent: Jan. 5, 2010

(54) FUEL CELL ELECTRODE, MEMBRANE-ELECTRODE ASSEMBLY, AND FUEL CELL SYSTEM

(75) Inventors: Bosung Ku, Suwon-si (KR);
Sang-Young Son, Cincinnati, OH (US);
Chang-Ryul Jung, Seoul (KR);
Hong-Ryul Lee, Suwon-si (KR);
Jae-Hyuk Jang, Seongnam-si (KR)

(73) Assignee: Samsung Electro-Mechanis Co., Ltd., Suwon (KR)

( * ) Notice: Subject to any disclaimer, the term of this patent is extended or adjusted under 35 U.S.C. 154(b) by 74 days.

(21) Appl. No.: 12/007,686

(22) Filed: Jan. 14, 2008

(65) Prior Publication Data
US 2008/0268320 A1    Oct. 30, 2008

(30) Foreign Application Priority Data
Apr. 25, 2007    (KR) .................... 10-2007-0040555

(51) Int. Cl.
*H01M 4/00*    (2006.01)
(52) U.S. Cl. .................... 429/40; 429/30; 429/34; 429/38; 429/42; 429/44
(58) Field of Classification Search ............... 204/409, 204/451, 601; 429/30, 34, 38, 42, 44
See application file for complete search history.

(56) References Cited

U.S. PATENT DOCUMENTS

| | | | |
|---|---|---|---|
| 2004/0067405 A1* | 4/2004 | Turpin et al. ............ | 429/38 |
| 2005/0208366 A1* | 9/2005 | Rohwer et al. ........... | 429/44 |
| 2006/0105227 A1* | 5/2006 | Kim et al. ............... | 429/44 |

* cited by examiner

*Primary Examiner*—Jerry Lorengo
*Assistant Examiner*—Heng M Chan

(57) ABSTRACT

An electrode for a fuel cell, and a membrane-electrode assembly and a fuel cell system that include the electrode are disclosed. An electrode for a fuel cell that includes an electrode substrate, a first channel formed in the electrode substrate, a first hydrophilic interface formed on an inner surface on one side of the first channel which guides liquids, and a first hydrophobic interface formed facing the first hydrophilic interface which guides gases, makes it possible for water obtained as a side product at the cathode to be separated from air without additional devices, so that it has a potential for utilization not only in portable electronic devices but also in low-capacity power source devices.

30 Claims, 7 Drawing Sheets

FUEL CELL ELECTRODE, MEMBRANE-ELECTRODE ASSEMBLY, AND FUEL CELL SYSTEM

CROSS-REFERENCE TO RELATED APPLICATIONS

This application claims the benefit of Korean Patent Application No. 10-2007-0040555 filed with the Korean Intellectual Property Office on Apr. 25, 2007, the disclosure of which is incorporated herein by reference in its entirety.

BACKGROUND

1. Technical Field

The present invention relates to an electrode for a fuel cell, and to a membrane-electrode assembly and a fuel cell system that include the electrode.

2. Description of the Related Art

With rapid changes in electronic apparatus towards smaller products having greater functionality, a new field on which to focus research efforts is to meet the demands for higher efficiency and longer run time in power supply devices. Accordingly, the fuel cell, which converts chemical energy directly into electrical energy, is rising in importance as a new alternative method to increasing efficiency and run time.

The fuel cell is a power generation system which converts the chemical reaction energy of hydrogen and oxygen contained in hydrocarbon-based substances, such as methanol, ethanol, and natural gases, directly into electrical energy.

A fuel cell may be divided according to the type of electrolyte used, into a phosphoric acid fuel cell, molten carbonate fuel cell, solid oxide fuel cell, polymer electrolyte membrane fuel cell, or alkaline fuel cell. Although each of these fuel cells is operated by the same principle, each is different in terms of the type of fuel used, operating temperature, catalyst, and electrolyte, etc.

Among these, the polymer electrolyte membrane fuel cell (PEMFC) has superb output characteristics and low operating temperature, as well as fast activation and response characteristics. Thus, it has a wide range of applicability including not only movable power sources, such as those used in vehicles, but also distributed power sources, such as in houses and public buildings, and miniature power sources, such as for electronic apparatus.

In a fuel cell, hydrogen and fuel are supplied at the anode, while an oxidant is supplied at the cathode. Here, an oxidizing reaction of the hydrogen or fuel occurs at the anode, and a reduction reaction of the oxidant occurs at the cathode. The movement of electrodes thus created generates electricity, with heat and water generated as side products.

The generated water may have to be removed immediately through an outlet, because if the water is not removed, not only may the oxygen supply pressure gradually increase, but also the water content in the polymer electrolyte membrane inside the membrane-electrode assembly may be increased.

Thus, in order to discharge the water generated, a PEMFC or a direct methanol fuel cell (DMFC) employs a technique of forced pressure discharge using a blower. However, in forced pressure discharge, the efficiency may be decreased in inverse proportion to the size of the structure, because of the increased fluid resistance in microchannels or microstructures due to the relative increase in contact area between the fluid and the walls. Moreover, the force that can be created by a fan or blower mountable in a micro fuel cell may become significantly low compared to the capillary forces, when applied in a microstructure.

Therefore, research is needed on impact factors that maximize or minimize capillary forces which may induce abnormal flow, according to the operation requirements of miniature fuel cells, and there is a need for effectively discharging water produced in a fuel cell without using additional devices.

SUMMARY

An aspect of the invention is to provide an electrode for a fuel cell, and a membrane-electrode assembly and fuel cell system that include the electrode, which allow improved miniaturization and increased efficiency, as the water to be discharged from the fuel cell may be separated from air.

One aspect of the claimed invention provides an electrode for a fuel cell that includes an electrode substrate, a first channel formed in the electrode substrate, a first hydrophilic interface formed on an inner surface on one side of the first channel which guides liquids, and a first hydrophobic interface formed facing the first hydrophilic interface which guides gases.

Another aspect of the claimed invention provides a membrane-electrode assembly which includes a membrane, a fuel electrode coupled to one side of the membrane which oxidizes fuel, and an air electrode coupled to the other side of the membrane which reduces an oxidant, where at least one of the fuel electrode and the air electrode includes an electrode substrate, a first channel formed in the electrode substrate, a first hydrophilic interface formed on an inner surface on one side of the first channel which guides liquids, and a first hydrophobic interface formed facing the first hydrophilic interface which guides gases.

Yet another aspect of the claimed invention provides a fuel cell system which includes a membrane-electrode assembly, which in turn includes a membrane, a fuel electrode coupled to one side of the membrane which oxidizes fuel, and an air electrode coupled to the other side of the membrane which reduces an oxidant; one or more separators positioned on either side of the membrane-electrode assembly, each of which may have a gas conduit; a fuel supply part which supplies fuel to the fuel electrode; and an oxidant supply part, which supplies an oxidant to the air electrode, where at least one of the fuel electrode and the air electrode includes an electrode substrate, a first channel formed in the electrode substrate, a first hydrophilic interface formed on an inner surface on one side of the first channel which guides liquids, and a first hydrophobic interface formed facing the first hydrophilic interface which guides gases.

Certain embodiments of the claimed invention may include one or more of the following features.

The thickness of the first channel may be 100 to 110 μm, and there may be a second channel and a third channel branching off at one end of the first channel.

There may be a second hydrophobic interface additionally included, which may be formed on an inner surface on one side of the second channel and connected with the first hydrophobic interface, and there may be a second hydrophilic interface additionally included, which guides liquids and which may be formed on an inner surface on the other side of the second channel facing the second hydrophobic interface.

There may be a third hydrophilic interface additionally included, which may be formed on an inner surface on one side of the third channel and connected with the first hydrophilic interface, and there may be a third hydrophobic interface additionally included, which guides gases and which may be formed on an inner surface on the other side of the third channel facing the third hydrophilic interface.

Furthermore, there may be a fourth channel and a fifth channel branching off at one end of the second channel, while there may be a fourth hydrophobic interface which may be formed on an inner surface on one side of the fourth channel and connected with the second hydrophobic interface, and/or a fifth hydrophilic interface which may be formed on an inner surface on one side of the fifth channel and connected with the second hydrophilic interface.

Additional aspects and advantages of the present invention will be set forth in part in the description which follows, and in part will be obvious from the description, or may be learned by practice of the invention.

DETAILED DESCRIPTION

Figure 1:
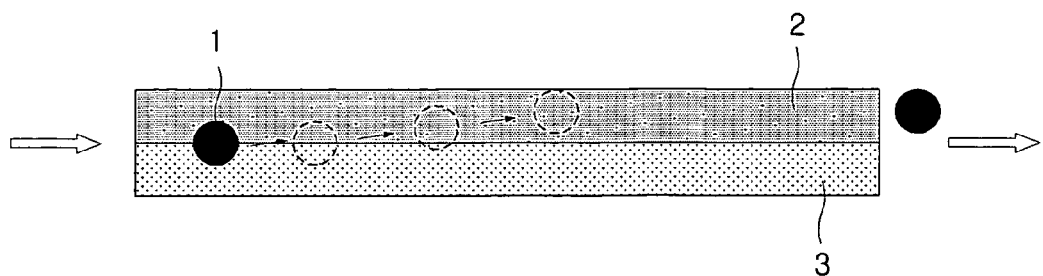
FIG. 1 is a schematic drawing illustrating the movement of a liquid droplet at a hydrophilic interface and a hydrophobic interface.

The electrode for a fuel cell, and a membrane-electrode assembly and fuel cell system including the electrode, according to certain embodiments of the invention will be described below in more detail with reference to the accompanying drawings, in which those components are rendered the same reference numeral that are the same or are in correspondence, regardless of the figure number, and redundant explanations are omitted.

Figure 2:
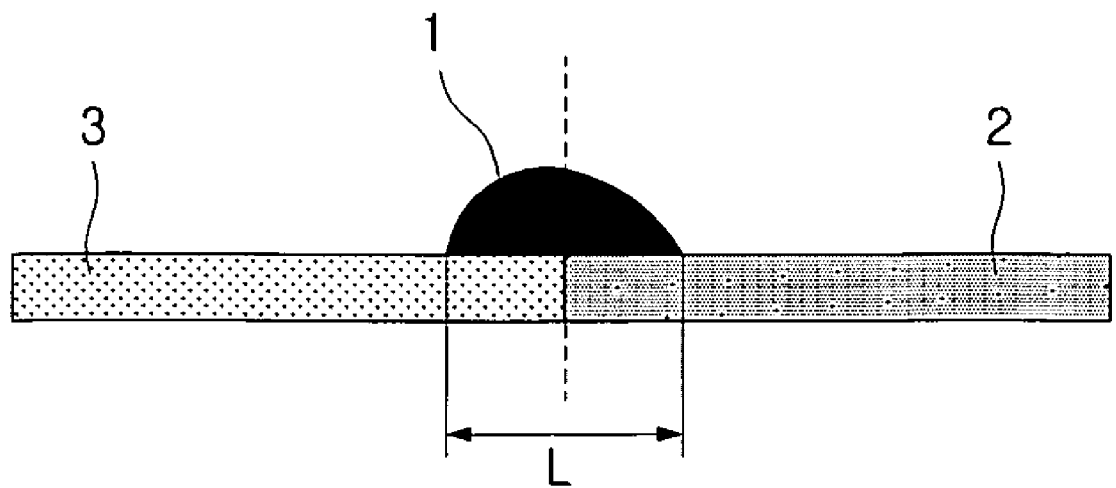
FIG. 2 is a cross-sectional view illustrating the contact angle of a liquid droplet at a hydrophilic interface and a hydrophobic interface.

FIG. 1 is a schematic drawing illustrating the movement of a liquid droplet at a hydrophilic interface and a hydrophobic interface, and FIG. 2 is a cross-sectional view illustrating the contact angle of a liquid droplet at a hydrophilic interface and a hydrophobic interface. In FIGS. 1 and 2 are illustrated a liquid droplet 1, a hydrophilic interface 2, and a hydrophobic interface 3.

An aspect of the claimed invention provides a fuel cell electrode and a membrane-electrode assembly and fuel cell system including the electrode, in which the design range of microchannels at the electrode of the fuel cell may be adjusted, and the surface characteristics may be dividedly sputtered into a hydrophilic interface and a hydrophobic interface, after which water and air may be separated using capillary forces, to improve miniaturization and increase efficiency.

Referring to FIGS. 1 and 2, the contact angle that a liquid droplet 1 makes with another substance is an intrinsic property of a substance. In particular, if there is a difference in surface characteristics in the material being contacted, as illustrated in FIG. 2, there is a difference in contact angle of the liquid droplet 1. This may create a phenomenon in which the liquid droplet 1 is moved in a particular direction by the difference in pressure caused by a difference in surface tension, as illustrated in FIG. 1.

This phenomenon is caused by a kind of capillary action, and when a liquid droplet 1 is placed in contact with a surface having a hydrophilic interface 2 and a hydrophobic interface 3, it tends to rapidly move towards a surface of the hydrophilic interface 2. Thus, by utilizing this phenomenon and applying surface treatment on a microtubule to give it a hydrophilic interface 2 and a hydrophobic interface 3, the phenomenon shown in FIGS. 1 and 2 may be reproduced.

If the above phenomenon is applied to the electrode of a fuel cell, the water produced at the air electrode, i.e. the cathode, may readily be separated from air without any additional equipment, which may provide a great potential for utilization not only in portable electronic devices but also in low-capacity power source devices.

Figure 3:
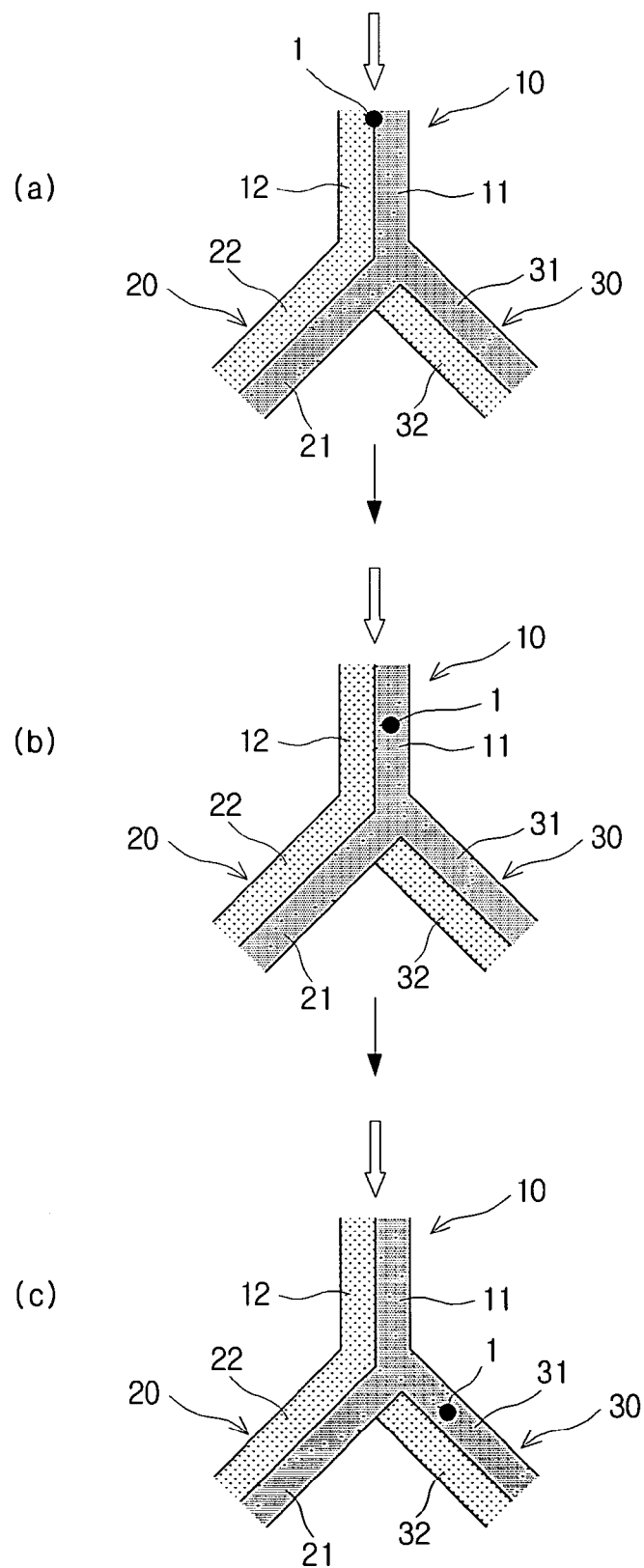
FIG. 3 is a flow diagram illustrating gas-liquid separation at an electrode for a fuel cell according to an embodiment of the claimed invention.

FIG. 3 is a flow diagram illustrating gas-liquid separation at an electrode for a fuel cell according to an embodiment of the claimed invention. In FIG. 3 are illustrated a liquid droplet 1, hydrophilic interfaces 11, 21, 31, hydrophobic interfaces 12, 22, 32, a first channel 10, a second channel 20, and a third channel 30.

A fuel cell electrode may generally be made of a catalyst layer, which takes part in electrochemical reactions, and a gas diffusion layer, which supports the catalyst layer. The gas diffusion layer may be formed in contact with separators, and may serve to permeate and diffuse gases so as to provide fuel or reactant gases, such as air, etc., evenly from the gas conduits of the separators to the catalyst in the catalyst layer.

The gas diffusion layer may also serve to permeate water, so as to quickly discharge the water produced by the reaction in the catalyst layer to the gas conduits, and may serve as an electron conductor, so as to conduct electrons required by or generated during the reaction.

To perform the functions described above, a porous conductive substrate may generally be used for the gas diffusion layer. Examples of materials that may be used for the electrode substrate include carbon paper, carbon cloth, and carbon felt, etc.

In this embodiment, the meaning of an electrode substrate is regarded as that which includes the catalyst layer and the gas diffusion layer. Thus, the channels provided in this embodiment may be formed in the catalyst layer and/or may be formed in the gas diffusion layer. The channels may also be applicable to outside structures for separating air and water.

In this embodiment, in order that the moisture content of the polymer electrolyte membrane may be kept constant and the water formed at the cathode may readily be discharged, so that the blocking of pores by water may be prevented, and thereby a fuel electrode may be provided which displays enhanced current density, a hydrophilic channel may be formed in the electrode substrate which allows superb water separation.

With reference to FIG. 3, the following describes the movement of a liquid droplet 1 according to pressure differences caused by differences in surface tension due to the differences in contact angle of the liquid droplet 1 at the hydrophilic interfaces 11, 21, 31 and hydrophobic interfaces 12, 22, 32.

In a fuel cell electrode, which may be used to form the fuel electrode and air electrode in a fuel cell, the electrode substrate that forms the electrode may be formed with a first channel 10, second channel 20, and third channel 30.

As illustrated in (a) of FIG. 3, the first channel 10 may include a hydrophilic interface 11 formed in an inner surface that guides and discharges liquids, i.e. a liquid droplet 1 in this embodiment, and a hydrophobic interface 12 formed facing the hydrophilic interface 11 that guides and discharges gases.

The first channel 10 may be a capillary tube, and in certain examples, the diameter of the first channel 10 may desirably be 100 micrometers. Capillary forces are natural forces and hence do not require any external power, so that the use of active components, such as fans, etc., which require external power sources, may be minimized.

When the liquid droplet 1 enters the first channel 10, a difference occurs in the contact angle between the liquid droplet 1 and the hydrophilic interface 11 and the contact angle between the liquid droplet 1 and the hydrophobic interface 12. Thus, because of the pressure difference due to the surface tension between the liquid droplet 1 and the hydrophilic interface 11 and the hydrophobic interface 12, the liquid droplet 1 moves towards the hydrophilic interface 11, as illustrated in (b) of FIG. 3.

The electrode may also be formed with a second channel 20 and a third channel 30 branching off at an end of the first channel 10.

The second channel 20 may have the hydrophobic interface 12 of the first channel 10 formed continuously into the second channel 20, and may include a hydrophilic interface 21 which faces the hydrophobic interface 22 and which guides and discharges liquids. Thus, a hydrophilic interface 21 and a hydrophobic interface 22 may each be formed in the channel, which may equally be applied to the first channel 10, second channel 20, and third channel 30.

The third channel 30 may have the hydrophilic interface 11 of the first channel 10 formed continuously into the third channel 30, and may include a hydrophobic interface 32 which faces the hydrophilic interface 31 and which guides and discharges gases.

Thus, as illustrated in (c) of FIG. 3, a liquid droplet 1 that has moved along the hydrophilic interface 11 of the first channel 10 may move to the third channel 30, which forms a hydrophilic interface 31 continued from the first channel 10, to finally leave the third channel 30.

In this way, by forming the cathode as a channel such as that described above, the water produced at the cathode may be separated from air. In addition, while this embodiment illustrates an electrode forming a Y-shaped channel, the invention is not thus limited, and it is apparent that any configuration may be used which can separate gases and liquid droplets along a hydrophilic interface and hydrophobic interface and which can readily be fabricated by those skilled in the art.

Also, the coating process for the hydrophilic interface and hydrophobic interface may include, but is not limited to, screen printing, spray coating, coating using a doctor blade, gravure coating, dip coating, silk-screening, painting, and slot die coating, etc.

Furthermore, it is apparent that the hydrophilic interface and/or hydrophobic interface may be coated with polymer material or may be implemented with metal coatings.

Figure 4:
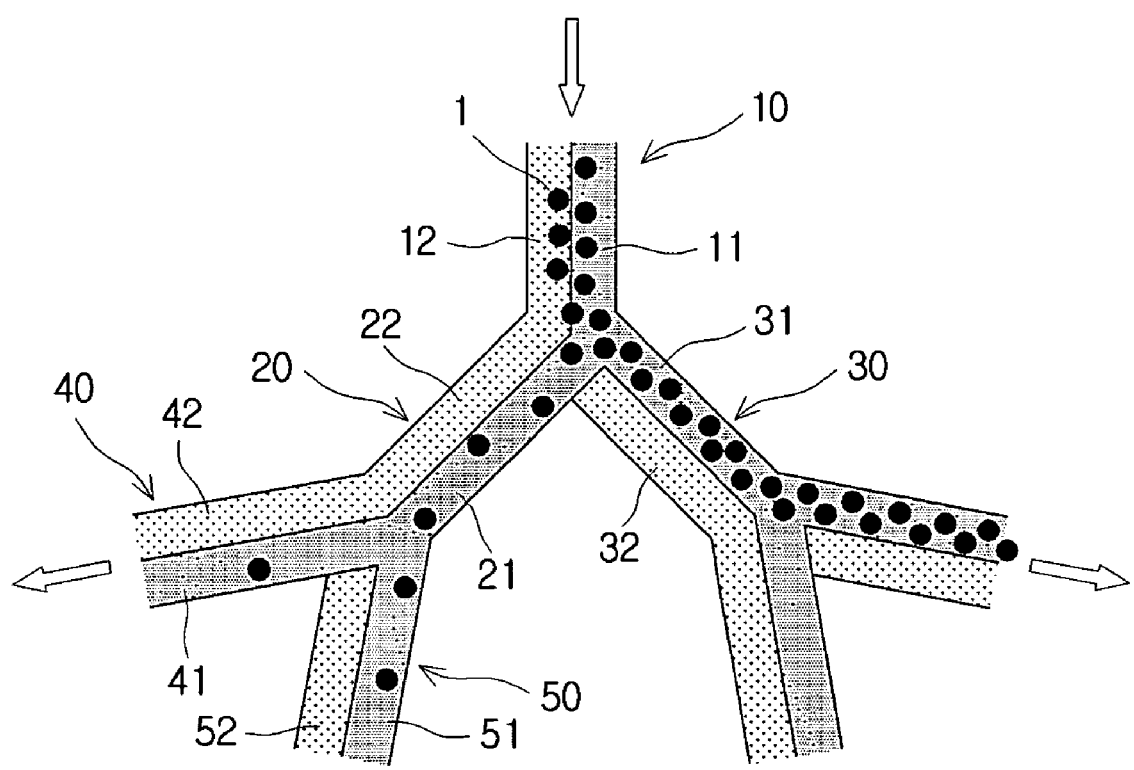
FIG. 4 is a cross-sectional view illustrating gas-liquid separation at an electrode for a fuel cell according to another embodiment of the claimed invention.

FIG. 4 is a cross-sectional view illustrating gas-liquid separation at an electrode for a fuel cell according to another embodiment of the claimed invention. In FIG. 4 are illustrated liquid droplets 1, hydrophilic interfaces 11, 21, 31, 41, 51, hydrophobic interfaces 12, 22, 32, 42, 52, a first channel 10, a second channel 20, a third channel 30, a fourth channel 40, and a fifth channel 50.

As shown in the drawing, the fourth channel 40 and fifth channel 50 may be formed branching off at an end of the second channel 20. The fourth channel 40 may the hydrophobic interface 22 of the second channel 20 formed continuously into the fourth channel 40, and may include a hydrophilic interface 41 formed facing the hydrophobic interface 42.

Also, the fifth channel 50 may have the hydrophilic interface 21 of the second channel 20 formed continuously into the fifth channel 50, and may include a hydrophobic interface 52 formed facing the hydrophilic interface 51.

When a large quantity of liquid droplets 1 enter the first channel 10, they may move according to the surface characteristics, to the hydrophilic interface 11 of the first channel 10. The liquid droplets 1 that have moved along the hydrophilic interface 11 of the first channel 10 may move to the hydrophilic interface 31 of the third channel 30, and after moving in turn along the hydrophilic interface formed along the branching channel of the third channel 30, they may be separated to the exterior.

Also, the number of liquid droplets 1 that have not been separated from the first channel 10 to the hydrophilic interface 31 of the third channel 30 may move along the hydrophilic interface 21 of the second channel 20 and move along the hydrophilic interface 51 of the fifth channel 50 branching off from the second channel 20 to be separated.

Thus, by forming a plurality of channels by having repeatedly branching channels, the liquid droplets 1 among air may be separated more effectively.

Figure 5:
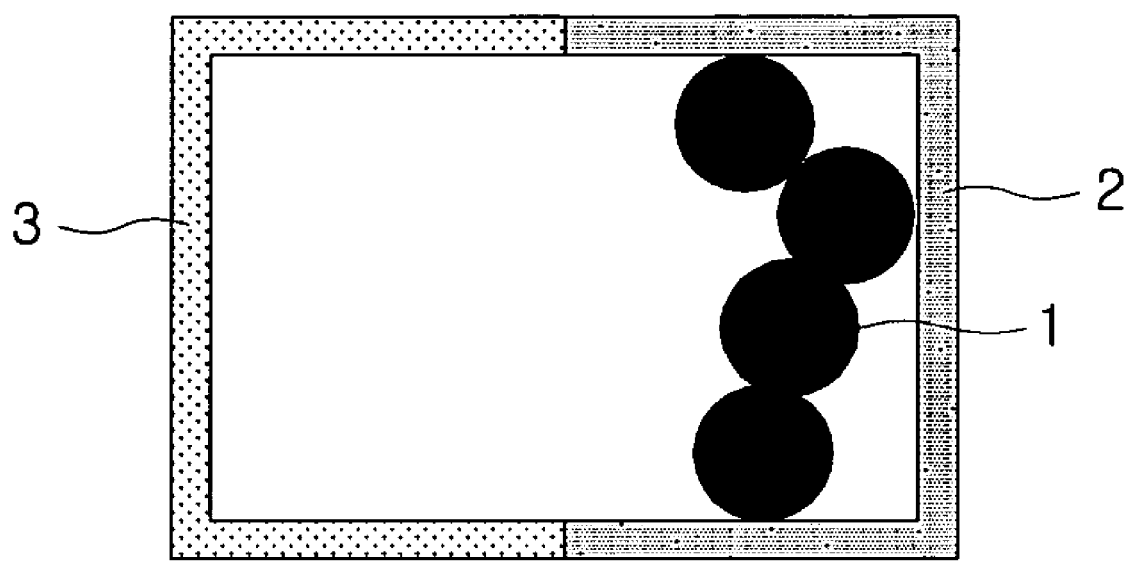
FIG. 5 is a plan view of the electrode for a fuel cell shown in FIG. 4.

Furthermore, as illustrated in FIG. 5, at the hydrophilic interface 2 and the hydrophobic interface 3, formed according to the surface treatment of the channel, a liquid droplet 1 may move according to pressure differences due to the surface tension caused by the contact angles, as the liquid droplet 1 touches the hydrophilic interface 2 and hydrophobic interface 3.

Figure 6:
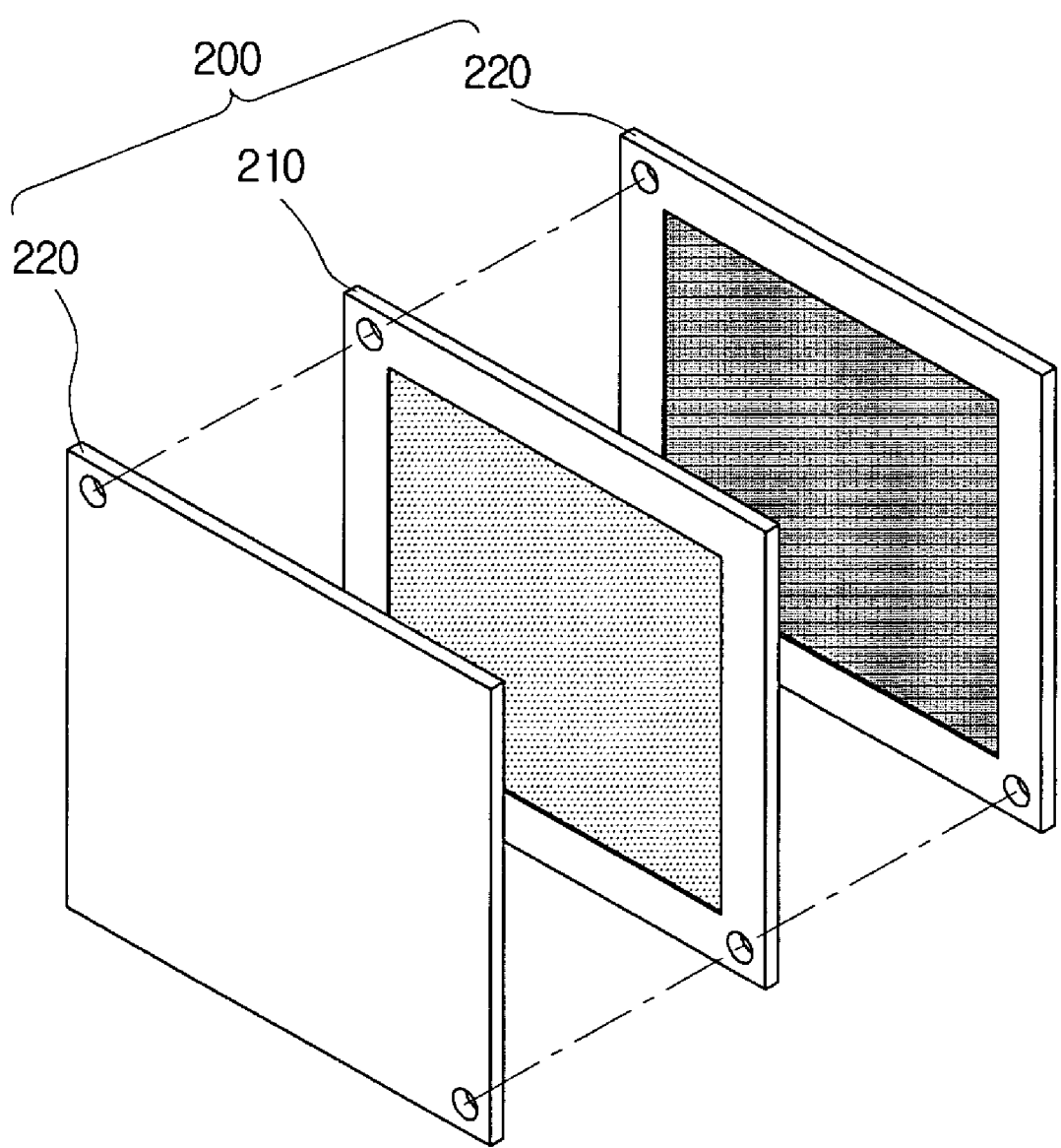
FIG. 6 is an exploded perspective view of a unit cell of a fuel cell.

FIG. 6 is an exploded perspective view of a unit cell of a fuel cell. In FIG. 6 are illustrated a unit cell 200, a membrane-electrode assembly 210, and separators 220.

A fuel cell stack 200 may have the form of a plurality of unit cells 200, each made of a membrane-electrode assembly 210 and separators 220 adhered on both sides, stacked such that they are electrically connected in series.

The membrane-electrode assembly 210 may be structured to have a fuel electrode, which oxidizes fuel, coupled to one side of a polymer electrolyte membrane and an air electrode, which reduces an oxidant, coupled to the other side of the membrane. The fuel electrode, which may be the anode, and/or the air electrode, which may be the cathode, may be made of a catalyst layer formed in contact with the polymer electrolyte membrane, and a gas diffusion layer formed in contact with the catalyst layer.

An oxidizing reaction of hydrogen or fuel may occur at the anode, and a reducing reaction of oxygen may occur at the cathode, where the movement of electrons generated here creates electricity, with side products of heat and water also created.

The first channel, which includes a hydrophilic interface formed on an inner surface that guides and discharges liquids and a hydrophobic interface formed facing the hydrophilic interface that guides and discharges gases, may be implemented as an electrode in the membrane-electrode assembly.

To be more specific, at least one of the fuel electrode and the air electrode may include an electrode substrate, a first channel formed in the electrode substrate, a first hydrophilic interface formed in an inner surface on one side of the first channel which guides liquids, and a first hydrophobic interface formed to face the first hydrophilic interface which guides gases.

In addition, a second channel and third channel branching off at an end of the first channel may also be included. The second channel may have the hydrophobic interface of the first channel formed in continuation in the second channel, while the third channel may have the hydrophilic interface formed continuously from the first channel.

Furthermore, it is apparent that a fourth channel and fifth channel may additionally be included which branch off at an end of the second channel.

Thus, by forming the electrode substrate of the cathode with channels that use capillary forces such as that provided in FIG. 4, a corresponding membrane-electrode assembly may be implemented, and the separation of liquids and gases can be achieved according to the surface characteristics of the hydrophilic interface and hydrophobic interface. Also, as the use of active components of external power sources such as fans can be minimized, the resultant fuel cell product can be made smaller.

In the separators 220 are formed gas conduits, which supply fuel required for the reaction of the fuel cell to the anode and supply oxygen to the cathode.

Figure 7:
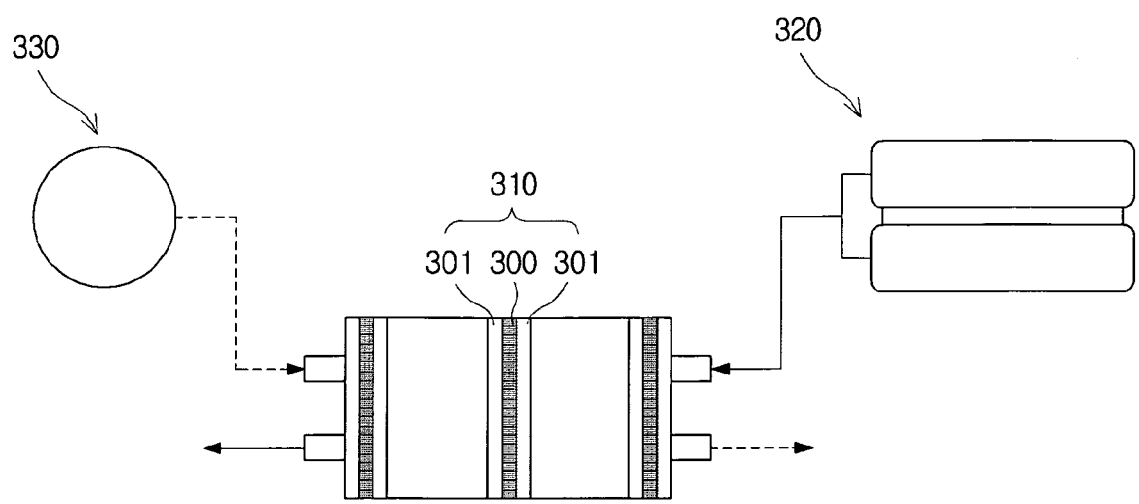
FIG. 7 is a schematic drawing illustrating a fuel cell system including an electrode based on an aspect of the claimed invention.

FIG. 7 is a schematic drawing illustrating a fuel cell system including an electrode based on an aspect of the claimed invention. In FIG. 7 are illustrated membrane-electrode assemblies 300, separators 301, an electricity generator part 310, a fuel supply part 320, and an oxidant supply part 330.

The fuel cell system may include a membrane-electrode assembly 300, an electricity generator part 310, a fuel supply part 320, and an oxidant supply part 330.

The membrane-electrode assembly 300 may include a membrane, a fuel electrode coupled to one side of the membrane which oxidizes fuel, and an air electrode coupled to the other side of the membrane which reduces an oxidant. To be more specific, there are a pair of electrodes having gas diffusion layers and catalyst layers, and a polymer electrolyte membrane positioned between the electrodes.

The separators 301 may be positioned on either side of the membrane-electrode assembly and may have gas conduits for supplying the fuel to the fuel electrode and supplying the oxidant to the air electrode. The electricity generator part 310 may generate electricity created by the electrochemical reaction of the fuel cell, and may include the membrane-electrode assembly 300 and the separators 301.

The fuel supply part 320 may supply fuel to the anode, i.e. the fuel electrode, while the oxidant supply part 330 may supply the oxidant to the cathode, i.e. the air electrode.

Here, at least one of the fuel electrode and the air electrode may include an electrode substrate, a first channel formed in the electrode substrate, a first hydrophilic interface formed in an inner surface on one side of the first channel which guides liquids, and a first hydrophobic interface formed facing the first hydrophilic interface which guides gases.

The thickness of the first channel may be 100 to 110 μm, an end of the first channel may branch into a second channel and a third channel, and the second channel may branch into a fourth channel and a fifth channel, where it is to be appreciated that the branching may occur multiple times.

The arrangement of the hydrophilic interface and hydrophobic interface in the second channel, third channel, fourth channel, and fifth channel are the same as those described with reference to FIG. 4, and the electrode in the membrane-electrode assembly of the fuel cell system are the same as the channels provided in FIG. 4.

As set forth above, according to certain embodiments of the claimed invention, water obtained as a side product at the cathode can be separated from air without additional devices, so that the embodiments have a potential for utilization not only in portable electronic devices but also in low-capacity power source devices.

In addition, as capillary forces are natural forces that do not require external power, the use of active components, such as fans, etc., which require external power sources, can be minimized.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. An electrode for a fuel cell, the electrode comprising:
an electrode substrate;
a first channel formed in the electrode substrate;
a first hydrophilic interface formed on an inner surface on one side of the first channel and configured to guide liquids, the first hydrophilic interface being extended in a flowing direction of the first channel; and
a first hydrophobic interface formed on an inner surface on the other side of the first channel so as to face the first hydrophilic interface and configured to guide gases, the first hydrophobic interface being extended in a flowing direction of the first channel.

2. The electrode for a fuel cell according to claim 1, wherein a thickness of the first channel is 100 to 110 μm.

3. The electrode for a fuel cell according to claim 1, further comprising a second channel and a third channel branching off at one end of the first channel.

4. The electrode for a fuel cell according to claim 3, further comprising a second hydrophobic interface formed on an inner surface on one side of the second channel and connected with the first hydrophobic interface.

5. The electrode for a fuel cell according to claim 4, further comprising a second hydrophilic interface formed on an inner surface on the other side of the second channel facing the second hydrophobic interface, the second hydrophilic interface configured to guide liquids.

6. The electrode for a fuel cell according to claim 3, further comprising a third hydrophilic interface formed on an inner surface on one side of the third channel and connected with the first hydrophilic interface.

7. The electrode for a fuel cell according to claim 6, further comprising a third hydrophobic interface formed on an inner surface on the other side of the third channel facing the third hydrophilic interface, the third hydrophobic interface configured to guide gases.

8. The electrode for a fuel cell according to claim 5, further comprising a fourth channel and a fifth channel branching off at one end of the second channel.

9. The electrode for a fuel cell according to claim 8, further comprising a fourth hydrophobic interface formed on an inner surface on one side of the fourth channel and connected with the second hydrophobic interface.

10. The electrode for a fuel cell according to claim 8, further comprising a fifth hydrophilic interface formed on an inner surface on one side of the fifth channel and connected with the second hydrophilic interface.

11. A membrane-electrode assembly comprising:
a membrane;
a fuel electrode coupled to one side of the membrane and configured to oxidize fuel; and
an air electrode coupled to the other side of the membrane and configured to reduce an oxidant,
wherein at least one of the fuel electrode and the air electrode comprises:
an electrode substrate;
a first channel formed in the electrode substrate;

a first hydrophilic interface formed on an inner surface on one side of the first channel and configured to guide liquids, the first hydrophilic interface being extended in a flowing direction of the first channel; and a first hydrophobic interface formed on an inner surface on the other side of the first channel so as to face the first hydrophilic interface and configured to guide gases, the first hydrophobic interface being extended in a flowing direction of the first channel.

12. The membrane-electrode assembly of claim 11, wherein a thickness of the first channel is 100 to 110 μm.

13. The membrane-electrode assembly of claim 11, further comprising a second channel and a third channel branching off at one end of the first channel.

14. The membrane-electrode assembly of claim 13, further comprising a second hydrophobic interface formed on an inner surface on one side of the second channel and connected with the first hydrophobic interface.

15. The membrane-electrode assembly of claim 14, further comprising a second hydrophilic interface formed on an inner surface on the other side of the second channel facing the second hydrophobic interface, the second hydrophilic interface configured to guide liquids.

16. The membrane-electrode assembly of claim 13, further comprising a third hydrophilic interface formed on an inner surface on one side of the third channel and connected with the first hydrophilic interface.

17. The membrane-electrode assembly of claim 16, further comprising a third hydrophobic interface formed on an inner surface on the other side of the third channel facing the third hydrophilic interface, the third hydrophobic interface configured to guide gases.

18. The membrane-electrode assembly of claim 15, further comprising a fourth channel and a fifth channel branching off at one end of the second channel.

19. The membrane-electrode assembly of claim 18, further comprising a fourth hydrophobic interface formed on an inner surface on one side of the fourth channel and connected with the second hydrophobic interface.

20. The membrane-electrode assembly of claim 18, further comprising a fifth hydrophilic interface formed on an inner surface on one side of the fifth channel and connected with the second hydrophilic interface.

21. A fuel cell system comprising:

a membrane-electrode assembly, the membrane-electrode assembly comprising a membrane, a fuel electrode coupled to one side of the membrane and configured to oxidize fuel, and an air electrode coupled to the other side of the membrane and configured to reduce an oxidant;

a separator positioned on either side of the membrane-electrode assembly and having a gas conduit;

a fuel supply part configured to supply fuel to the fuel electrode; and an oxidant supply part configured to supply an oxidant to the air electrode, wherein at least one of the fuel electrode and the air electrode comprises:

an electrode substrate;

a first channel formed in the electrode substrate;

a first hydrophilic interface formed on an inner surface on one side of the first channel and configured to guide liquids, the first hydrophilic interface being extended in a flowing direction of the first channel; and a first hydrophobic interface formed on an inner surface on the other side of the first channel so as to face the first hydrophilic interface and configured to guide gases, the first hydrophobic interface being extended in a flowing direction of the first channel.

22. The fuel cell system of claim 21, wherein a thickness of the first channel is 100 to 110 μm.

23. The fuel cell system of claim 21, further comprising a second channel and a third channel branching off at one end of the first channel.

24. The fuel cell system of claim 23, further comprising a second hydrophobic interface formed on an inner surface on one side of the second channel and connected with the first hydrophobic interface.

25. The fuel cell system of claim 24, further comprising a second hydrophilic interface formed on an inner surface on the other side of the second channel facing the second hydrophobic interface, the second hydrophilic interface configured to guide liquids.

26. The fuel cell system of claim 23, further comprising a third hydrophilic interface formed on an inner surface on one side of the third channel and connected with the first hydrophilic interface.

27. The fuel cell system of claim 26, further comprising a third hydrophobic interface formed on an inner surface on the other side of the third channel facing the third hydrophilic interface, the third hydrophobic interface configured to guide gases.

28. The fuel cell system of claim 25, further comprising a fourth channel and a fifth channel branching off at one end of the second channel.

29. The fuel cell system of claim 28, further comprising a fourth hydrophobic interface formed on an inner surface on one side of the fourth channel and connected with the second hydrophobic interface.

30. The fuel cell system of claim 28, further comprising a fifth hydrophilic interface formed on an inner surface on one side of the fifth channel and connected with the second hydrophilic interface.

* * * * *